US012621348B2

(12) United States Patent
Bansal et al.

(10) Patent No.: US 12,621,348 B2
(45) Date of Patent: May 5, 2026

(54) NETWORK SECURITY POLICY MANAGEMENT

(71) Applicant: Salesforce, Inc., San Francisco, CA (US)

(72) Inventors: Kaushal Bansal, San Francisco, CA (US); Prabhat Singh, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 270 days.

(21) Appl. No.: 17/961,743

(22) Filed: Oct. 7, 2022

(65) Prior Publication Data

US 2024/0121271 A1 Apr. 11, 2024

(51) Int. Cl.
*H04L 9/40* (2022.01)
*H04L 41/14* (2022.01)
(52) U.S. Cl.
CPC ............ *H04L 63/20* (2013.01); *H04L 41/145* (2013.01)

(58) Field of Classification Search
CPC .... H04L 63/20; H04L 41/145; H04L 41/0894
USPC .............................................................. 726/4
See application file for complete search history.

(56) References Cited

U.S. PATENT DOCUMENTS

| | | | | |
|---|---|---|---|---|
| 2015/0269383 | A1* | 9/2015 | Lang ...................... | G06F 21/57 |
| | | | | 726/1 |
| 2018/0234459 | A1* | 8/2018 | Kung ................... | H04L 63/0263 |
| 2018/0309796 | A1* | 10/2018 | Lang ................... | H04L 63/0263 |
| 2021/0120029 | A1* | 4/2021 | Ross ................... | G06F 16/2379 |

* cited by examiner

*Primary Examiner* — Tan Doan
(74) *Attorney, Agent, or Firm* — Butzel Long

(57) ABSTRACT

Systems, devices, and techniques are disclosed for network security policy management. A file including code written using a Domain Specific Language (DSL) for network security may be received. A cloud native enforcement artifact may be generated from the code written using DSL in the file. A policy domain model including hierarchical data, relational data, and graph data for a network security policy may be generated from the code written using DSL in the file and the cloud native enforcement artifact. The policy domain model may be stored in a persistent storage.

17 Claims, 9 Drawing Sheets

Receive File with Domain Specific Language Code
502

Generate Cloud Native Enforcement Artifacts
504

Generate Policy Domain Model
506

Store Policy Domain Model
508

Display Policy Domain Model
602

Receive Input to the Policy Domain Model
604

Modify Cloud Native Enforcement Artifacts
606

Take No Action
512

NETWORK SECURITY POLICY MANAGEMENT

BACKGROUND

An intent based domain specific language (DSL) may be used to define security policies for an application, such as a Software-as-a-Service (SaaS) application, running on a cloud computing server system. The DSL may be designed for use by developers of the application, who may not have detailed knowledge of network security. A service of the cloud computing server system may interpret policies defined using DSL to generate cloud native enforcement artifacts, which may be machine-readable files that specify network security policies in a manner that is useable by the cloud computing server system on which the policies are being enforced. This may make it difficult for network security engineers to both understand and modify the network security policies being used by an application, as the specification of the policies in the DSL may be too abstract, and the cloud native enforcement artifacts may be too obscure.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
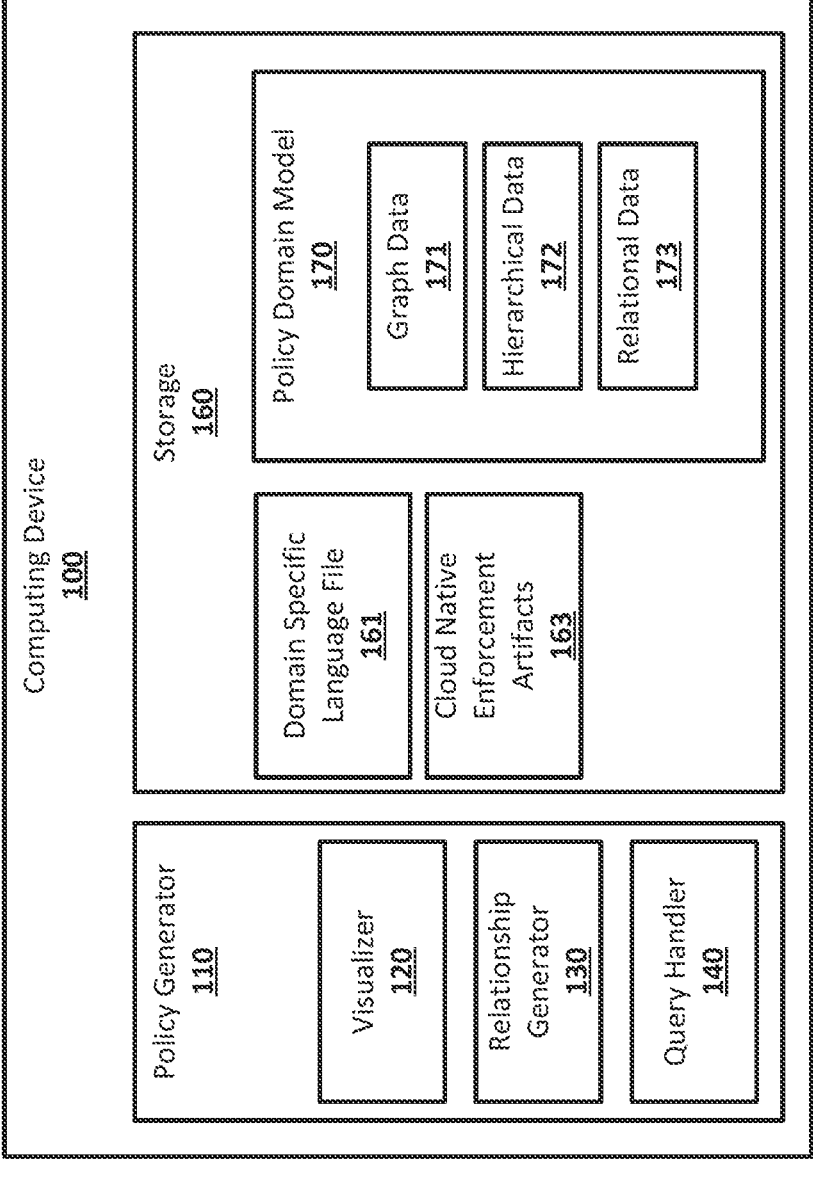
FIG. 1 shows an example system suitable for network security policy management according to an implementation of the disclosed subject matter.

Techniques disclosed herein enable network security policy management, which may allow for the viewing and managing of network security policies generated using a Domain Specific Language (DSL) and implemented with cloud native enforcement artifacts. A file including code written using a DSL for network security may be received. A cloud native enforcement artifact may be generated from the code written using DSL in the file. A policy domain model including hierarchical data, relational data, and graph data for a network security policy may be generated from the code written using the DSL and the cloud native enforcement artifact. The policy domain model may be stored in a persistent storage. A graph based on the graph data of the policy domain model, a hierarchical listing based on the hierarchical data of the policy domain model, and a query interface for querying the relational data of the policy domain model may be displayed. An input to the graph, hierarchical listing, or query interface indicating a change to the network security policy may be received. A cloud native enforcement artifact may be modified based on the indicated change to the network security policy.

A file including code written using a DSL for network security may be received. A DSL may be used by a developer of an application, such as a Software-as-a-Service (SaaS) application, to write code that defines the network security policies that will be needed by the application. The DSL may be an intent-based language. The policies described using a DSL may include, for example, the types of network services on a cloud computing server system the application will need access to in order to run properly on the cloud computing server system. For example, a SaaS application running on a cloud computing server system may need to be able to communicate with other SaaS applications running on that cloud computing server system. The code written in DSL for such a SaaS application may specify the need for this type of network access, for example, identifying the other SaaS applications that will be communicated with. The code written in DSL for an application may be stored in file which may be received at the cloud computing server system on which the application is installed, for example, along with the installation of the application.

A cloud native enforcement artifact may be generated from the code written using DSL in the file. A policy generator service of cloud computing server system on which the application is installed may use the code written in DSL in the file received with the application to generate cloud native enforcement artifacts to implement the policies defined using the DSL. Because the DSL is intent based, the code written using DSL may not be directly implemented as network security policies by the cloud computing server system. The code written using DSL may, for example, not directly specify which ports should be open and which should be closed, what protocols should be used by open ports, and what services should be exposed through open ports. The server system may run a policy generator service that may interpret policies defined using DSL to generate cloud native enforcement artifacts that may include machine-implementable network security policies. The cloud native enforcement artifacts generated from a file that includes DSL defining network security policies for an application may be stored on the cloud computing server system on which that application will run, and may be generated in a format suitable for that cloud computing server system. The cloud native enforcement artifacts may define network security policies on an implementation-level, including specifying which ports should be opened and closed and when, what network communication protocols are used on which ports, and what services will be exposed through open ports. The cloud native enforcement artifacts may be generated for efficient implementation of network security policies by a cloud computing server system, which may make the network security policies defined in the cloud native enforcement artifacts difficult for a human reader of the cloud native enforcement artifacts to discern. A human network security engineer, presented with both the file with code written in DSL defining network security policies for an application and the cloud native enforcement artifacts generated from that file may not be able to readily determine the actual network security policies used by the application, such as which ports are opened are closed, what services are exposed on open ports, and which protocols are in use. The cloud native enforcement artifacts for an application may also be stored in a repository for the application.

A policy domain model including hierarchical data, relational data, and graph data for a network security policy may be generated from the code written using the DSL and the cloud native enforcement artifact. The policy domain model for an application may be a model of the network security policies for an application that were defined using DSL and implemented using cloud native enforcement artifacts that allows for better human-readability, searchability, and visual modeling of the network security policies. The policy domain model may include details that are not specified in the code written using DSL and may be hard to decipher from the cloud native enforcement artifacts. These details may include, for example, the port numbers of ports that are open and closed, exposed services, and protocols used. The policy domain model may be generated by, for example, the policy generator service. The policy domain model may include hierarchical data, which may be used to represent the network security policies hierarchically, relational data, which may be used to represent the network security policies as a relational database, and graph data, which may be used to represent the network security policies using a graph visualization. The policy domain model for an application may be generated at any suitable time. For example, the policy domain model may be generated on-demand, in an ad hoc manner, or may be updated live after being initially generated. The policy domain model may be used to answer questions about the network security policies that are being implemented for an application, such as, for example, what services are exposed on what ports and what network security policies correspond to the services, how many network security policies are using non-standard ports, how many network security policies are defined for North-South traffic and how many for East-West traffic, what the distribution of network security policies for different instances of an application is, and how the network security policies are distributed among different network segments.

The policy domain model may be stored in a persistent storage. The policy domain model may be stored in any suitable persistent storage of the cloud computing server system. This may allow the policy domain model to be accessed for use in network security policy management.

A graph based on the graph data of the policy domain model, a hierarchical listing based on the hierarchical data of the policy domain model, and a query interface for querying the relational data of the policy domain model may be displayed. The graph may be a visual, graph-based, representation of the network security policies. For example, the graph may be a connected graph in which the services made available by the network security policies are nodes that are connected to each other. The hierarchical listing may be a listing of network security policies in any suitable hierarchical manner. For example, the hierarchical listing may include a list of ports grouped by whether they are open or closed at a top-level of the hierarchy, with protocols and services listed for open ports and lower levels of the hierarchy. The query interface may be, for example, an interface a user may use to submit queries to be run against a relational database based on the relational data. The relational database may be a queryable relational database in any suitable format with any number of tables that may include records of all the ports that are opened and closed, exposed services, and protocols used. The relational database may be queried through, for example, a Web API. Queries may be used to answer any suitable questions about the network security policies being implemented for the application. The graph, hierarchical listing, and relational database may all be representations of the network security policy as indicated by the graph data, hierarchal data, and relational data of the policy domain model.

An input to the graph, hierarchical listing, or query interface indicating a change to the network security policy may be received. A user, using any suitable input device, may make an input to the graph, hierarchical listing, or query interface. The input may indicate a change to the network security policy represented by the graph, hierarchical listing, or relational database. For example, a user may a select a port that is listed as open in a hierarchical listing and input that the selected port should be closed. The input may be made to the graph, hierarchical listing, or query interface in any suitable manner, for example, through selection of an aspect of network security policy displayed as part of a hierarchy in the hierarchical listing, as a node in the graph, or through a query input to the query interface to run against to the relational database. In some implementations, the query interface may be used to directly input changes to tables of the relational database using a graphical user interface rather than through running a query. The change indicated by the input may be a change to any suitable aspect of network security policy, such as, for example, opening or closing ports, exposing or hiding services on ports, changing protocols in use, and blocking or permitting communication with other specified computing devices based on IP address or domain name. The change may be stored as a change to the graph data, hierarchical data, or relational data of the policy domain model.

A cloud native enforcement artifact may be modified based on the indicated change to the network security policy. The policy generator service may use any changes input to the policy domain model to modify, or generate new, cloud native enforcement artifacts. The modified, or new, cloud native enforcement artifacts may implement network security policy as changed by the user inputs made to the graph, hierarchical listing, or query interface of the policy domain model and reflected in changes to the graph data, hierarchical data, or relational data. The modified or new cloud native enforcement artifacts may replace previously generated cloud native enforcement artifacts for the application on the cloud computing server system and in repositories. This may a allow a user, for example, a network security engineer, to make changes to the network security policy for an application through the policy domain model for that application, without the user needing to directly modify either the code written in DSL or the cloud native enforcement artifacts.

FIG. 1 shows an example system for network security policy management according to an implementation of the disclosed subject matter. A computing device 100 may be any suitable computing device, such as, for example, a computer 20 as described in FIG. 7, or component thereof, for network security policy management. The computing device 100 may include a policy generator 110, a visualizer 120, a relationship generator 130, a query handler 140, a security system 150, and a storage 160. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 100 may be part of a computing system and network infrastructure, or may be otherwise connected to the computing system and network infrastructure, including a larger server network which may include other server systems similar to the computing device 100. The computing device 100 may include any suitable combination of central processing units (CPUs), graphical processing units (GPUs), and tensor processing units (TPUs).

The policy generator 110 may be any suitable combination of hardware and software of the computing device 100 for generating cloud native enforcement artifacts from code written in DSL, a policy domain model from code written in DSL and cloud native enforcement artifacts, and updated cloud native enforcement artifacts from a policy domain model. For example, the policy generator 110 may be a service running on the computing device 100 generate cloud native enforcement artifacts 163 from a domain specific language file 161. The domain specific language file 161 may include code written in a DSL that defines network security policies for an application, such as a SaaS application, that may be run on a cloud computing server system that may include the computing device 100. The cloud native enforcement artifacts 163 generated by the policy generator 110 from the domain specific language file 161 may be files used to implement the network security policies defined in the domain specific language file 161 and may be in a format that is suitable for machine-reading and implementation. The policy generator 110 may also generate a policy domain model 170 from the domain specific language file 161 and the cloud native enforcement artifacts 163. The policy domain model 170 may be a model of the network security policies as defined in the domain specific language file 161 and as implemented by the cloud native enforcement artifacts 163, and may include data such as, for example, which ports are open are closed, which protocols are in use, and which services are exposed. The policy domain model 170 may include graph data 171, hierarchical data 172, and relational data 173. When a user changes the network security policies through input that changes data in the policy domain model 170 the policy generator 110 may update the cloud native enforcement artifacts 163 to implement these changes, either through modifying the previously generated cloud native enforcement artifacts 163 or generating new cloud native enforcement artifacts.

The visualizer 120 may be any suitable combination of hardware and software for generating a visualization of a policy domain model. For example, the visualizer 120 may be a component of the policy generator 110 that may generate a graph based on the graph data 171 of the policy domain model 170. The graph may be a visual representation of the network security policies defined in the domain specific language file 161 and as implemented by the cloud native enforcement artifacts 163. For example, the nodes of the graph may represent services made available by the network security policies. The graph generated by the visualizer 120 may allow user input that may change aspects of the network security policies, for example, making services unavailable. The visualizer 120 may also generate a hierarchical listing based on the hierarchical data 172. The hierarchical listing may represent aspects of the network security policies, such as the ports, services, and protocols, in a hierarchical manner.

The relationship generator 130 may be any suitable combination of hardware and software for comparing generating relationships between various aspects of the network security policies. For example, the relationship generator 130 may be a component of the policy generator 110 that may generate relationships between aspects of the network security policy, such as ports, services, and protocols and their statuses as implemented by the cloud native enforcement artifacts 163 and store these relationships as graph data 171, hierarchical data 172 and relational data 173. The graph data 171 may store relationships among aspects of the network security policy that may be usable to generate a graph representing the aspects of the network security policies. The hierarchical data 172 may store hierarchical relationships among the aspects of the network security policies, and the relational data 173 may store the aspects of the network security policies as records for use in a relational database. The hierarchal data 172 may be used to display a hierarchical listing, which may allow user input that may change aspects of the network security policies.

The query handler 140 may be any suitable combination of hardware and software for handling queries to a database. For example, the query handler 140 may be a component of the policy generator 110 that may handle queries run against a relational database that uses the relational data 173 of the policy domain model 170. The query handler 140 may handle queries in any suitable format and may be compatible with the database system of the relational database that uses the relational data 173. The query handler 140 may run any suitable queries against the relational database, including queries that may change the data in the relational data 173, resulting in changes to the network security policies. The query handler 140 may receive queries through any suitable interface, such as, for example, through a Web API.

The storage 160 may be any suitable combination of hardware and software for storing data. The storage 160 may include any suitable combination of volatile and non-volatile storage hardware, and may include components of the computing device 100 and hardware accessible to the computing device 100, for example, through wired and wireless direct or network connections. The storage 160 may store, for example, the domain specific language file 161, the cloud native enforcement artifacts 163, and the policy domain model 170 including the graph data 171, the hierarchical data 172, and the relational data 173.

Figure 2:
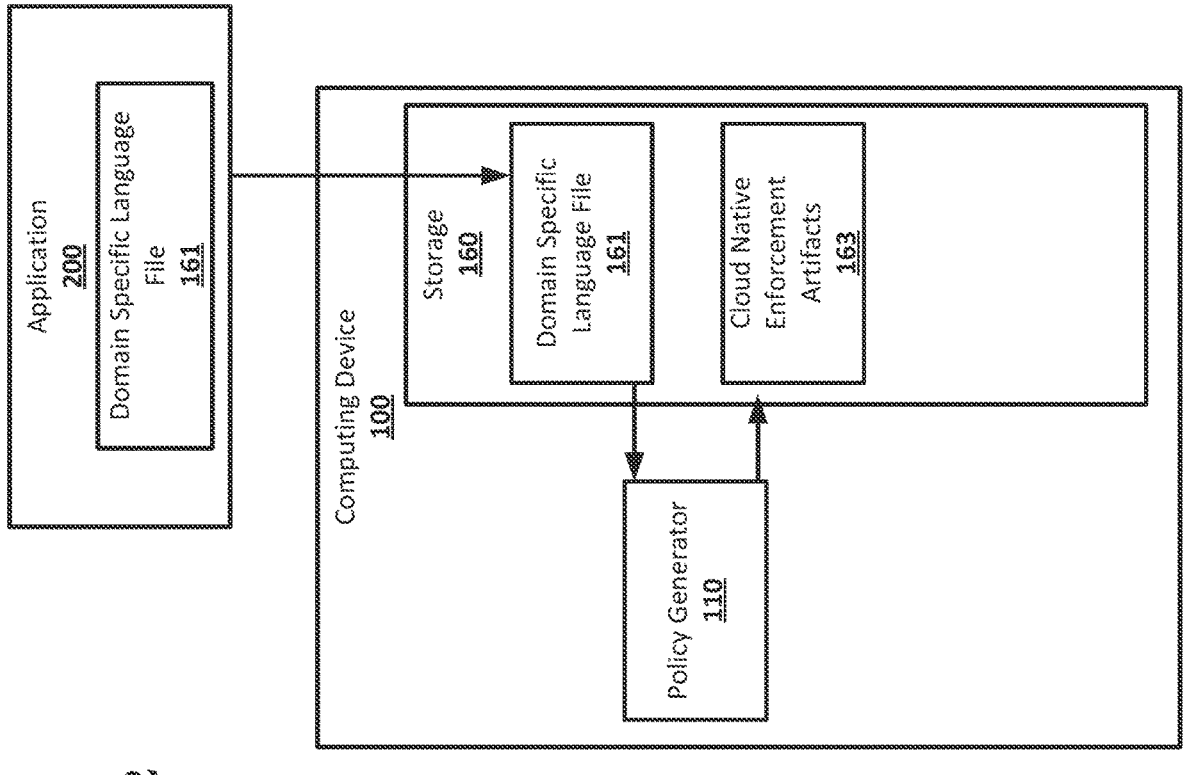
FIG. 2 shows an example arrangement suitable for network security policy management according to an implementation of the disclosed subject matter.

FIG. 2 shows an example arrangement suitable for network security policy management according to an implementation of the disclosed subject matter. An application 200 may be an instance of an application, for example, a SaaS application, set up on any suitable computing device or system, for example, a cloud computing server system. The application may include, as one of its files, the domain specific language file 161, which may include code, written in DSL, that defines network security policies for the application 200. The domain specific language file 161 may be stored in the storage 160 of the computing device 100 as part of the installation of the application 200, for example, as an instance, on a cloud computing server system of which the computing device 100 may be a part.

The policy generator 110 may generate the cloud native enforcement artifacts 163 from the domain specific language file 161. The cloud native enforcement artifacts 163 may be generated to implement the network security polices defined in the domain specific language file 161, and may be in a format suitable for machine interpretation and implementation, for example, specifying ports that should be opened and closed, protocols in use, and services exposed. The cloud native enforcement artifacts 163 may be stored in the storage 160 and may be used by the cloud computing server system to implement network security policies for the application 200, an instance of which may be installed on the cloud computing server system.

Figure 3:
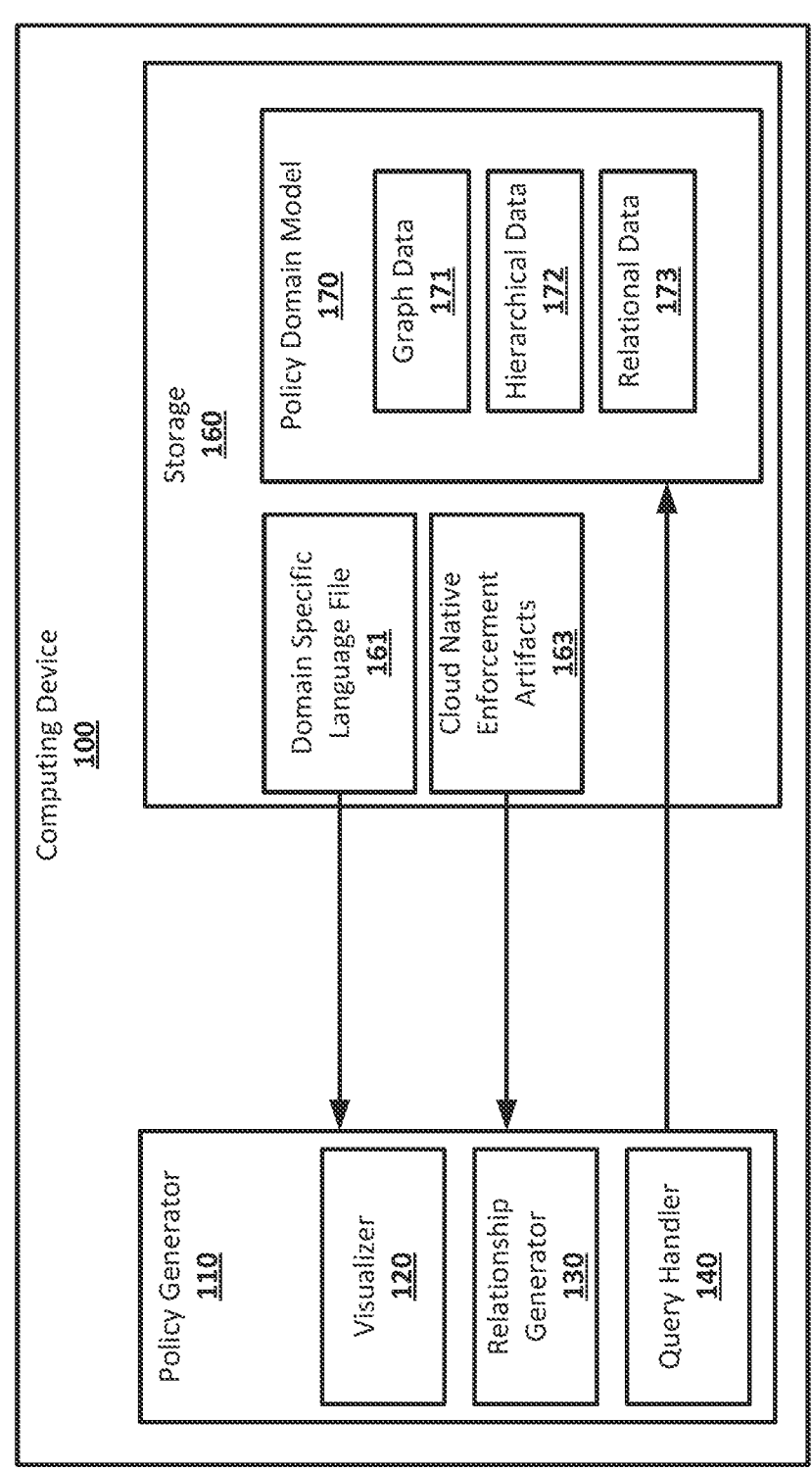
FIG. 3 shows an example arrangement suitable for network security policy management according to an implementation of the disclosed subject matter.

FIG. 3 shows an example arrangement suitable for network security policy management according to an implementation of the disclosed subject matter. The policy generator 110 may generate the policy domain model 170 from the domain specific language file 161 and the cloud native enforcement artifacts 163. The policy domain model 170 may include data describing the network security policies implemented for the application 200 on the cloud computer server system, including, for example, port numbers for opened and closed ports, which protocols are in use on which ports, which services are exposed.

The policy generator 110 may include a relationship generator 130 which may determine relationships between various aspects of the network security policies defined by the domain specific language file 161 and the cloud native enforcement artifacts 163. The relationship generator 130 may, for example, generate the graph data 171, hierarchical data 172, and relational data 173, which may each include different relationships among the aspects of the network security policy.

The policy domain model 170 may be stored in the storage 160. The policy generator 110 may generate and update the policy domain model 170 at any suitable time and based on any suitable event. For example, the policy generator 110 may generate the policy domain model 170 when the application 200 is initially installed, in conjunction with the generation of the cloud native enforcement artifacts 163. The policy generator 110 may update the policy domain model 170 on an on-demand, regular, or ad-hoc basis, for example, when requested by a user or when the network security policies for the application 200 are changed, resulting in changes to the cloud native enforcement artifacts 163.

Figure 4A:
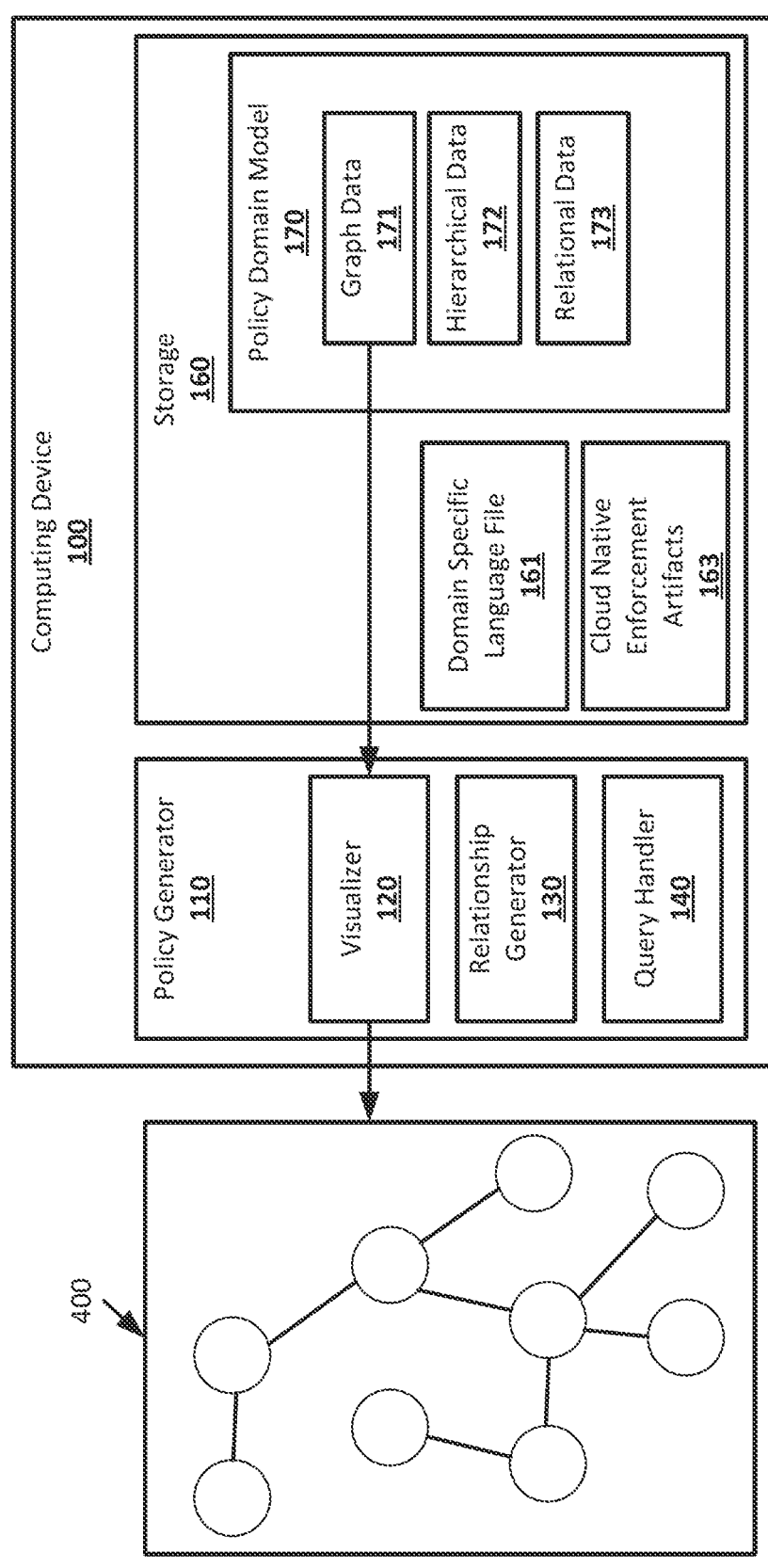
FIG. 4A shows an example arrangement suitable for network security policy management according to an implementation of the disclosed subject matter.

FIG. 4A shows an example arrangement suitable for network security policy management according to an implementation of the disclosed subject matter. A user may, using any suitable interface, indicate that they want to view a graph 400 of the policy domain model 170. The visualizer 120 may use the graph data 171 from the policy domain model 170 to generate the graph 400, which may be a graph with nodes that represent services made available by the network security policies for the application 200 as implemented by the cloud native enforcement artifacts 163. The visualizer 120 may generate the graph 400 in any suitable manner and the graph 400 may be displayed on any suitable display device in communication with the computing device 100. A user may use any suitable input device to select and make changes to aspects of the graph 400 in order to change the network security polices for the application 200. For example, the user may select a node of the displayed graph 400 and may choose to hide an exposed service represented by that node. Changes to the network security policies input to the graph 400 may cause the policy generator 100 to update, or generate anew, the cloud native enforcement artifacts 163 in order to implement the input change. The policy domain model 170 may also be updated by the policy generator 110 to reflect the change.

Figure 4B:
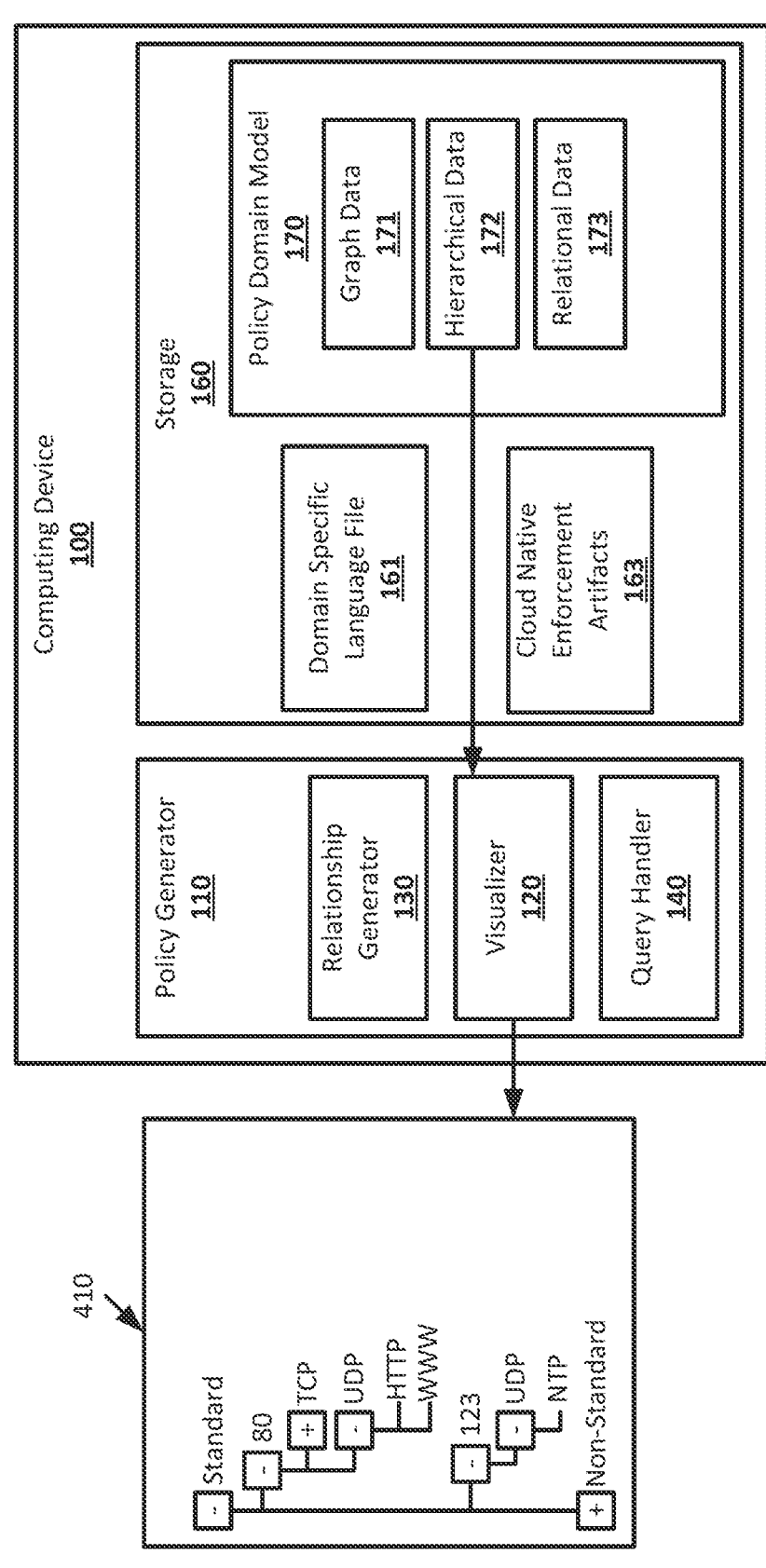
FIG. 4B shows an example arrangement suitable for network security policy management according to an implementation of the disclosed subject matter.

FIG. 4B shows an example arrangement suitable for network security policy management according to an implementation of the disclosed subject matter. A user may, using any suitable interface, indicate that they want to view a hierarchical listing 410 of the policy domain model 170. The visualizer 120 may use the hierarchical data 172 from the policy domain model 170 to generate the hierarchical listing 410, which may be a hierarchical representation of the relationship between ports, protocols, and services, and their statuses, that are aspects of the network security policy for the application 200 as implemented by the cloud native enforcement artifacts 163. The visualizer 120 may generate the hierarchical listing 410 in any suitable manner and the hierarchical listing 410 may be displayed on any suitable display device in communication with the computing device 100. A user may use any suitable input device to select and make changes to aspects of the hierarchical listing 410 in order to change the network security polices for the application 200. For example, the user may select a port displayed as part of the hierarchical listing 410 and may choose to close that port. Changes to the network security policies input to the hierarchical listing 410 may cause the policy generator 100 to update, or generate anew, the cloud native enforcement artifacts 163 in order to implement the input change. The policy domain model 170 may also be updated by the policy generator 110 to reflect the change.

Figure 4C:
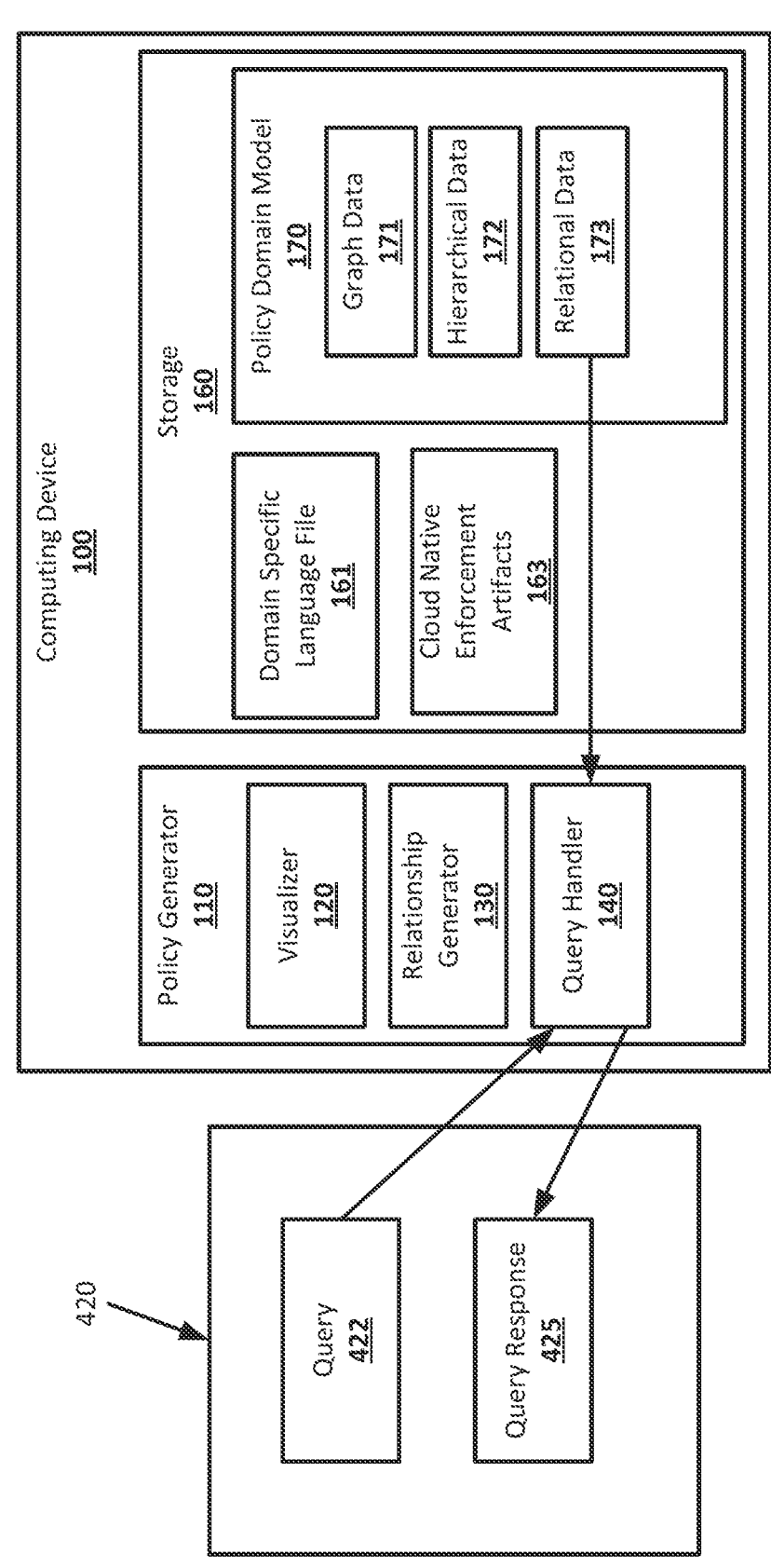
FIG. 4C shows an example procedure suitable for network security policy management according to an implementation of the disclosed subject matter.

FIG. 4C shows an example arrangement suitable for network security policy management according to an implementation of the disclosed subject matter. A user may, using any suitable interface, indicate that they want to view a query interface 420 in order to run queries against the policy domain model 170. The query interface 420 may allow a user to run queries against relational data 173 of the policy domain model 170. A user may enter a query 422 into the query interface 420. The query 422 may be written in any suitable format, and may, for example, be written using a query language that is compatible with a database system and format used by the query handler 140 and the relational data 173. The query handler 140 may run the query 422 against the relational data 173 and may return a query response 425 to the query interface 420. The query response 425 may include any suitable data for responding to the query 422 using data from the relational data 173. For example, the query response 425 may be relational database, including, for example, data in a table format, that is responsive to the query 422. If, for example, the query 422 requests a list of all non-standard open ports, the query response 425 may include a table with a row for each non-standard open port that is open as part of the network security policy for the application 200 as implemented by the cloud native enforcement artifacts 163, along with other data, such as protocols and services, associated with the non-standard open ports. A user may also use queries to make changes to aspects of the relational data 173 in order to change the network security polices for the application 200. For example, the user may submit a query that closes all nonstandard open ports. The query handler 140 may change the relational data 173 to reflect the change requested by this query. Changes to the network security policies made using the query interface 420 may cause the policy generator 100 to update, or generate anew, the cloud native enforcement artifacts 163 in order to implement the input changes. The policy domain model 170 may also be updated by the policy generator 110 to reflect the changes.

Figure 5:
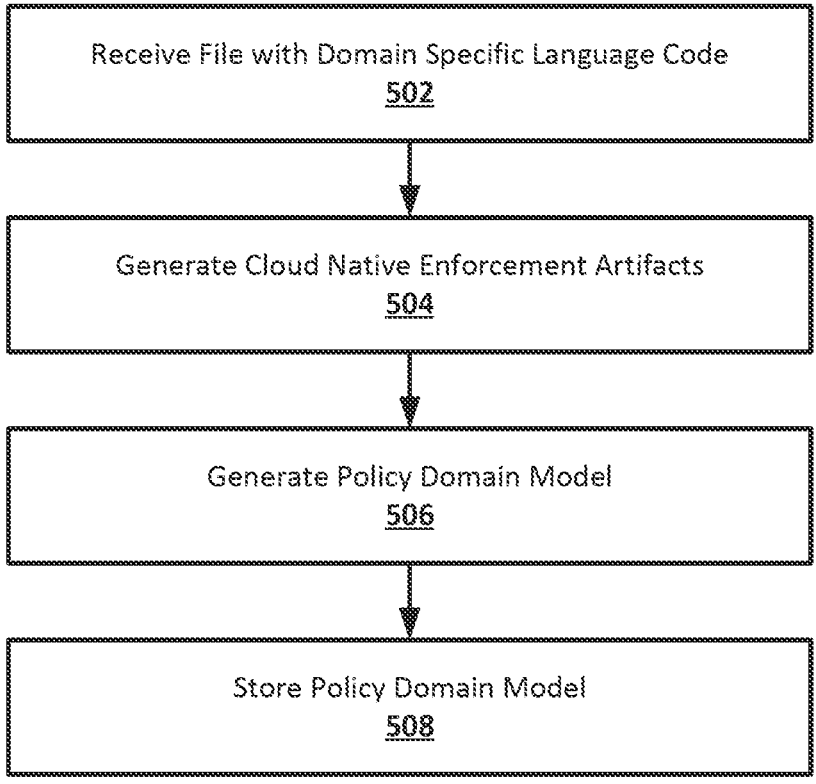
FIG. 5 shows an example procedure suitable for network security policy management according to an implementation of the disclosed subject matter.

FIG. 5 shows an example procedure suitable for network security policy management according to an implementation of the disclosed subject matter. At 502, a file with code written in a domain specific language may be received. For example, during the installation of the application 200, or an instance thereof, on a cloud computing server system, the computing device 100 may receive the domain specific language file 161. The domain specific language file 161 may include code written in a domain specific language that may be an intent based language used to define network security policies for the application 200, or the instance thereof, on the cloud computing server system.

At 504, cloud native enforcement artifacts may be generated. For example, the policy generator 110 may generate the cloud native enforcement artifacts 163 from the domain specific language file 161. The cloud native enforcement artifacts 163 may be, for example, files that may include machine-readable and implementable code for implementation of the network security policies defined in the domain specific language file 161. The cloud native enforcement artifacts 163 may, for example, define which ports are open and closed, which protocols are in use on open ports, and which services exposed through open ports. The format of the cloud native enforcement artifacts 163 may make them difficult for a human reader to interpret.

At 506, a policy domain model may be generated. For example, the policy generator 110 may use the domain specific language file 161 and the cloud native enforcement artifacts 163 to generate the policy domain model 170. The policy domain model 170 may include data about aspects of the network security policies for the application 200 as implemented by the cloud native enforcement artifacts 163. The policy domain model 170 may include, for example the graph data 171, hierarchical data 172, and relational data 173, which may be generated by the relationship generator 130 may represent different relationships among aspects, for example, ports, protocols, and services, of the network security policies.

At 508, the policy domain model may be stored. For example, the policy domain model 170 may be stored in the storage 160 of the computing device 100. The policy domain model 170 may be used to generate visualizations, such as the graph 400 and hierarchical listing 410, that display data for the network security policies in a way that a user, such a network security engineer, can interpret, while still including aspects of the network security policies as implemented by the cloud native enforcement artifacts 163, such as open and closed ports, protocols, and services, that may not be specified in the domain specific language file 161. The policy domain model 170 may allow for queries to be run against a relational database that includes data about aspects of the network security policies, for example, through the query interface 420.

Figure 6:
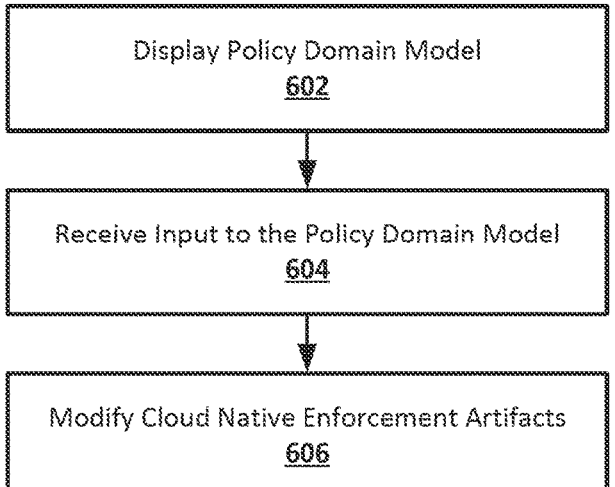
FIG. 6 shows an example procedure suitable for network security policy management according to an implementation of the disclosed subject matter.

FIG. 6 shows an example procedure suitable for network security policy management according to an implementation of the disclosed subject matter. At 602, a policy domain model may be displayed. For example, user may select to have the policy domain model 170 displayed using the graph 400 or hierarchical listing 410 or may display data from the policy domain model 170 based on running queries against the policy domain model 170. The graph 400 may be generated by the visualizer 120 using the graph data 171. The hierarchical listing 410 may be generated by the visualizer 120 using the hierarchical data 172. Queries input to the query interface 120 such as the query 422 may be run against the relational data 173 by the query handler 140, and data responsive to the query, such as the query response 425, may be displayed by the query interface 420.

At 604, input to the policy domain model may be received. For example, a user may, using any suitable input device for the computing device 100, input changes to the graph 400 or hierarchical listing 410 that may directly change data in the graph data 171 or the hierarchical data 172, or may run a query that may make change to the relational data 173. The changes may by any suitable changes to network security policies, including, for example, opening or closing ports, changing protocols used by ports, and exposing or hiding services on ports.

At 606, cloud native enforcement artifacts may be modified. For example, the policy generator 110 may update, or generate anew, the cloud native enforcement artifacts 163 to reflect changes made to the policy domain model 170. For example, if the user used the hierarchical listing 410 to close a port that had previously been opened, the policy generator 110 may need to modify the cloud native enforcement artifacts 163 so that they implement a network security policy in which the port the user chose to close is closed. The policy generator 110 may either update the already stored cloud native enforcement artifacts 163 to close this port, or may generate new cloud native enforcement artifacts 163 that close the port. The policy domain model 170, including the graph data 171, hierarchical data 172, and relational data 173, may also be updated to reflect the change to the network security policies made by the user.

Figures 7, 8:
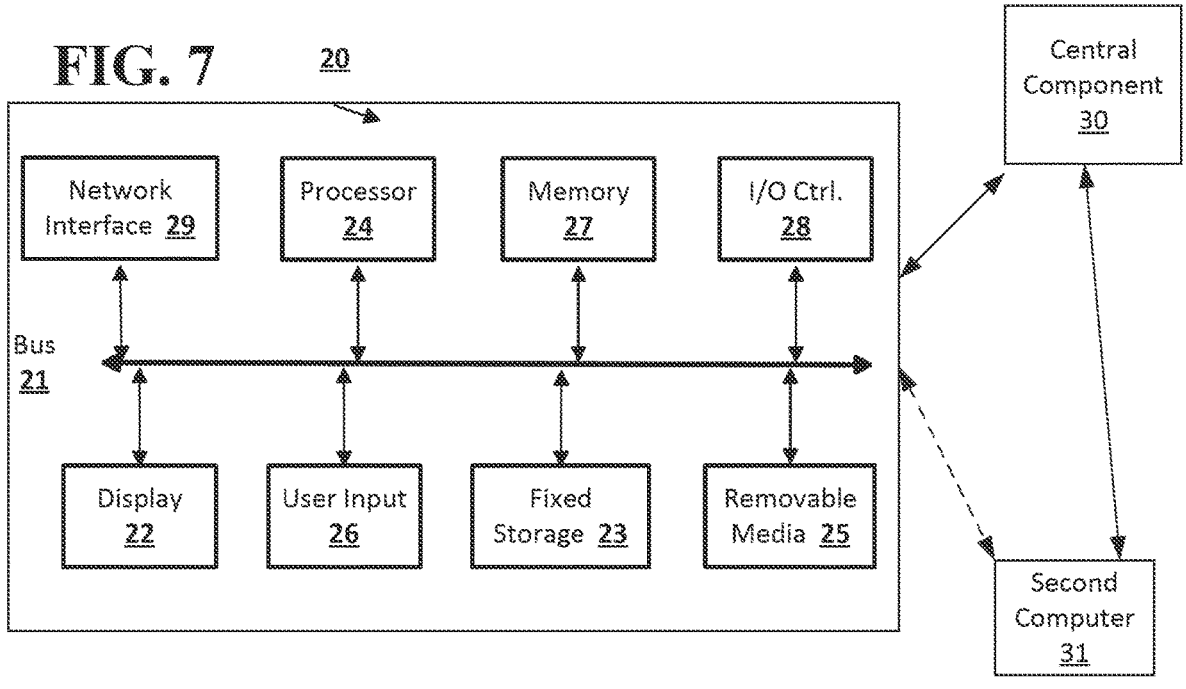
FIG. 7 shows a computer according to an implementation of the disclosed subject matter.
FIG. 8 shows a network configuration according to an implementation of the disclosed subject matter.

Implementations of the presently disclosed subject matter may be implemented in and used with a variety of component and network architectures. FIG. 7 is an example computer 20 suitable for implementing implementations of the presently disclosed subject matter. As discussed in further detail herein, the computer 20 may be a single computer in a network of multiple computers. As shown in FIG. 7, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 8.

Many other devices or components (not shown) may be connected in a similar manner (e.g., document scanners, digital cameras and so on). Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, removable media 25, or on a remote storage location.

FIG. 8 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:

receiving, at a computing device, at least one file comprising code written using a Domain Specific Language (DSL) for network security;

generating, by the computing device, from the code written using DSL in the file, at least one cloud native enforcement artifact;

generating, by the computing device, from the code written using DSL in the file and the at least one cloud native enforcement artifact, a policy domain model comprising one or more of hierarchical data, relational data, and graph data for a network security policy;

storing, by the computing device, the policy domain model in a persistent storage;

displaying, by the computing device, a graph based on the graph data of the policy domain model, wherein nodes of the graph represent services made available by network security policies from the at least one cloud native enforcement artifact;

receiving an input to the graph from a user, wherein the input indicates a change to the network security policy; and modifying the at least one cloud native enforcement artifact based on the indicated change to the network security policy from the input to the graph.

2. The computer-implemented method of claim 1, further comprising:

updating the policy domain model based on the indicated change to the network security policy.

3. The computer-implemented method of claim 1, wherein the graph comprises nodes representing services exposed by the network security policy.

4. The computer-implemented method of claim 1, wherein the hierarchical listing comprises a hierarchy of two or more of ports, services, and protocols.

5. The computer-implemented method of claim 1, wherein the DSL is an intent-based language for defining network security policies.

6. The computer-implemented method of claim 1, wherein the at least one cloud native enforcement artifact implements network security policies defined in the code written in DSL.

7. A computer-implemented system comprising:

a storage; and a processor that receives at least one file comprising code written using a Domain Specific Language (DSL) for network security, generates, from the code written using DSL in the file, at least one cloud native enforcement artifact, generates from the code written using DSL in the file and the at least one cloud native enforcement artifact, a policy domain model comprising one or more of hierarchical data, relational data, and graph data for a network security policy, stores, in the storage, the policy domain model in a persistent storage, displays a graph based on the graph data of the policy domain model, wherein nodes of the graph represent services made available by network security policies from the at least one cloud native enforcement artifact receives an input to the graph from a user, wherein the input indicates a change to the network security policy, and modifies the at least one cloud native enforcement artifact based on the indicated change to the network security policy from the input to the graph.

8. The computer-implemented system of claim 7, wherein the processor further updates the policy domain model based on the indicated change to the network security policy.

9. The computer-implemented system of claim 7 wherein the graph comprises nodes representing services exposed by the network security policy.

10. The computer-implemented system of claim 7, wherein the hierarchical listing comprises a hierarchy of two or more of ports, services, and protocols.

11. The computer-implemented system of claim 7, wherein the DSL is an intent-based language for defining network security policies.

12. The computer-implemented system of claim 7, wherein the at least one cloud native enforcement artifact implements network security policies defined in the code written in DSL.

13. A system comprising: one or more computers and one or more non-transitory storage devices storing instructions which are operable, when executed by the one or more computers, to cause the one or more computers to perform operations comprising:

receiving, at a computing device, at least one file comprising code written using a Domain Specific Language (DSL) for network security;

generating, by the computing device, from the code written using DSL in the file, at least one cloud native enforcement artifact;

generating, by the computing device, from the code written using DSL in the file and the at least one cloud native enforcement artifact, a policy domain model comprising one or more of hierarchical data, relational data, and graph data for a network security policy;

storing, by the computing device, the policy domain model in a persistent storage;

displaying, by the computing device, a graph based on the graph data of the policy domain model, wherein nodes of the graph represent services made available by network security policies from the at least one cloud native enforcement artifact;

receiving an input to the graph from a user, wherein the input indicates a change to the network security policy; and modifying the at least one cloud native enforcement artifact based on the indicated change to the network security policy from the input to the graph.

14. The system of claim 13, wherein the one or more computers and one or more non-transitory storage devices further store instructions which are operable, when executed by the one or more computers, to cause the one or more computers to further perform operations comprising:

updating the policy domain model based on the indicated change to the network security policy.

15. The system of claim 13, wherein the graph comprises nodes representing services exposed by the network security policy.

16. The system of claim 13, wherein the graph comprises nodes representing services exposed by the network security policy.

17. The system of claim 13, wherein the DSL is an intent-based language for defining network security policies.

\* \* \* \* \*